(12) United States Patent
Sonntag (10) Patent No.: US 8,934,528 B2
(45) Date of Patent: Jan. 13, 2015

(54) TRANSITION INTERVAL CODING FOR SERIAL COMMUNICATION

(75) Inventor: Jeffrey L. Sonntag, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 255 days.

(21) Appl. No.: 13/076,155

(22) Filed: Mar. 30, 2011

(65) Prior Publication Data

US 2012/0250746 A1   Oct. 4, 2012

(51) Int. Cl.
*H03K 7/04* (2006.01)
*H04L 25/49* (2006.01)
*H04L 25/06* (2006.01)

(52) U.S. Cl.
CPC .......... *H04L 25/4902* (2013.01); *H04L 25/061* (2013.01)
USPC .............................. 375/239; 375/340; 370/329

(58) Field of Classification Search
USPC .................................. 375/239, 340; 370/329
See application file for complete search history.

(56) References Cited

U.S. PATENT DOCUMENTS

| 4,689,740 | A | | 8/1987 | Moelands et al. | |
|---|---|---|---|---|---|
| 5,301,023 | A | * | 4/1994 | Zato ............................. | 348/476 |
| 5,398,326 | A | | 3/1995 | Lee | |
| 5,822,373 | A | * | 10/1998 | Addy ............................ | 375/259 |
| 5,864,872 | A | | 1/1999 | Lee et al. | |
| 2006/0164061 | A1 | | 7/2006 | Formenti et al. | |
| 2010/0249886 | A1 | * | 9/2010 | Park et al. ........................ | 607/60 |
| 2012/0149303 | A1 | * | 6/2012 | Moes et al. ................... | 455/41.1 |

FOREIGN PATENT DOCUMENTS

WO   WO96/36953   11/1996

OTHER PUBLICATIONS

Levenshtein, V.I. and Han Vinck, A.J., "Perfect (d, k)-Codes Capable of Correcting Single Peak-Shifts," IEEE Transactions on Information Theory, vol. 39, No. 2, Mar. 1993, 7 pages.

* cited by examiner

*Primary Examiner* — Leila Malek
(74) *Attorney, Agent, or Firm* — Abel Law Group, LLP (57) ABSTRACT

A one-wire transmission protocol utilizes transition interval coding in which a value of a transmitted symbol is determined by comparing an interval length between the voltage transition associated with the transmitted symbol and a prior voltage transition on the communication link, to a threshold transition interval provided to the receiving device during the transmission sequence that includes the transmitted symbol. If the interval length of the symbol is below the transition interval threshold, the symbol is determined to be a first value and if the interval length of the symbol is above the transition interval threshold, the symbol is determined to be a second value. The transition interval threshold is provided in a start sequence that includes at least two transitions. The threshold transition interval width is based on one or more transition intervals determined during the start sequence.

16 Claims, 4 Drawing Sheets

TRANSITION INTERVAL CODING FOR SERIAL COMMUNICATION

BACKGROUND

1. Field of the Invention

This invention relates to communications between devices and more particularly to communications over a serial interface.

2. Description of the Related Art

Serial communications are widely utilized, particularly in pin limited applications or where the communications medium requires serial transmission. Single pin serial communication links have been utilized with various protocols in order to provide communication capabilities for applications with very few available pins or even where pins are shared with another function. Some single pin protocols may have restrictive electrical and/or timing requirements and therefore have limited flexibility. Accordingly, improved serial communication protocols are desirable.

SUMMARY

Accordingly, in one embodiment a method of communicating is provided that includes determining in a receiving device a width of one or more first intervals defined by a first number of transitions on a communication link. One or more threshold intervals are defined based on the one or more first intervals. Additional transitions are received on the communication link that are associated with the first number of transitions. A value of each data symbol associated with each additional transition is determined based on whether a width of each interval is larger or smaller than at least one of the one or more threshold intervals.

In another embodiment a method includes detecting a transition on a communication link coupled to a receiving device. Responsive to the transition, a data symbol is determined to have been transferred, the data symbol being part of a transmission sequence. A value of the data symbol is determined by comparing an interval length between the transition and a prior transition on the communication link to a threshold interval, the prior transition determining an end of a previous interval associated with a previously sent data symbol. If the interval length is below the threshold interval, the value of the information symbol is determined to be a first value and if the interval length is above the threshold interval, the value of the information symbol is determined to be a second value.

In another embodiment a method for serially transmitting information on a communication link includes transmitting a data symbol by causing a transition on the communication link, the data symbol having an interval length defined between the transition and a previous transition on the communication link. The interval length is below a threshold interval if the data symbol is a first value and the interval length is above the threshold interval if the data symbol is a second value.

In another embodiment an apparatus is provided that includes communication link interface to receive a signal on a communication link. A transition detector detects transitions on the communication link. An interval measurement circuit is coupled to the transition detector and operable to determine an interval defined by a transition on the communication link and a previous transition on the communication link and supply a measured transition interval. Compare logic compares the measured transition interval associated with an information symbol to a threshold interval. The information symbol is determined to be a first value if the measured transition interval is less than the threshold interval and to be a second value if the measured transition interval is greater than the threshold interval.

In another embodiment a method includes determining in a receiving device a width of one or more first intervals defined by a first number of transitions on a communication link. One or more threshold intervals is defined based on the one or more first intervals, where the number of threshold intervals is m−1, m being an integer greater than or equal to 2. At least one additional transition on the communication link is received. An interval width between the at least one additional transition and an immediately prior transition is determined and a value of a data symbol associated with the at least one additional transition is determined to be one of m possible data values according to a comparison of the interval width and one or more of the (m−1) threshold intervals.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
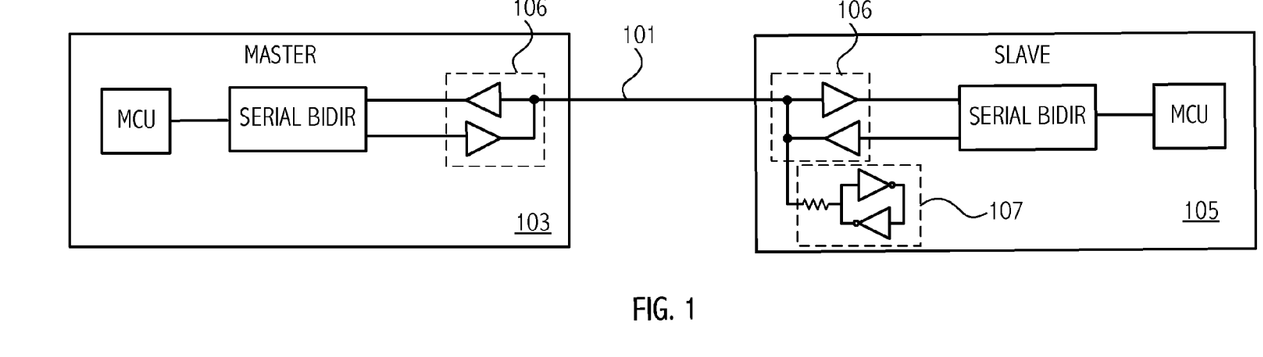
FIG. 1 illustrates a master and slave device incorporating an embodiment of the communication link described herein.

Referring to FIG. 1, a serial bidirectional single-wire communication link 101 couples a master device 103 and a slave device 105. The master and slaves devices include communication interfaces 106 and logic to handle serial bidirectional transfer of information over the single wire 101. Different protocols may be utilized for moving data downstream (from Master to Slave) and for moving data upstream (from Slave to Master). Thus, the downstream protocol may be unidirectional. In a preferred embodiment, the communication downstream includes both a protocol (a start sequence, and a reset interval) for framing the data, and a line code (transition interval coding) for the data.

Figure 2A:
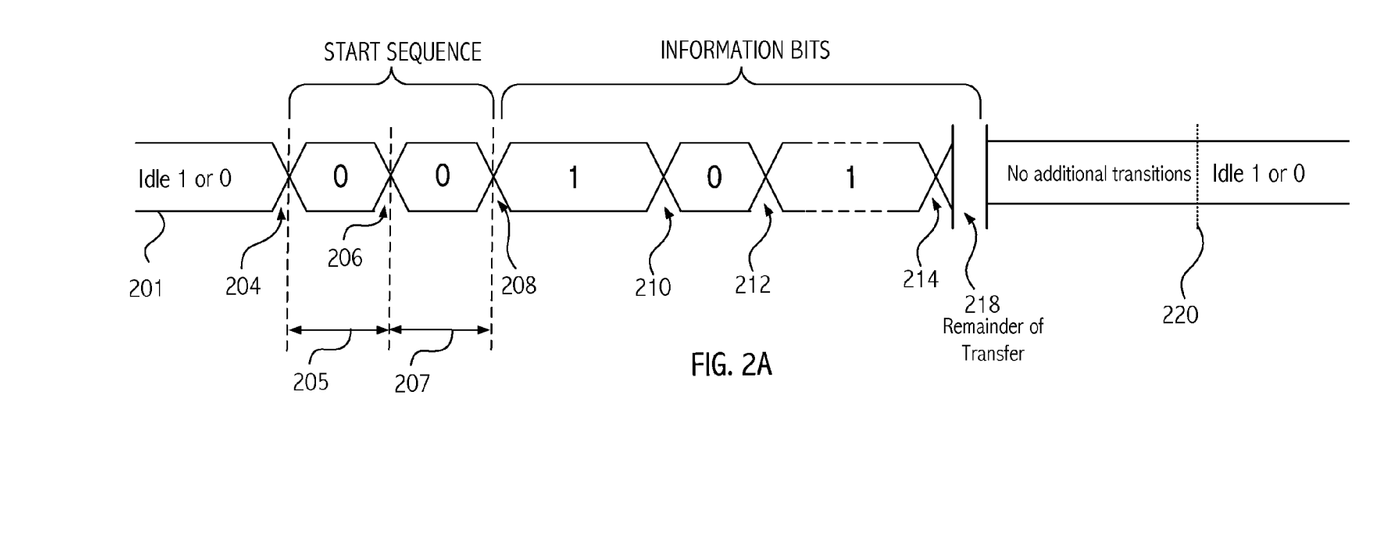
FIG. 2A illustrates a timing diagram illustrating operation of an embodiment of the communication link.

Referring to FIG. 2A, the portion of the timing diagram labeled Information Bits illustrates the downstream line code. Zeros are transmitted as short intervals between transitions, and ones are transmitted as long intervals between transitions. The actual polarity of the link during a transmitted one or zero is unimportant. The data bits are encoded only by the length of intervals between transitions. In the receive process in the slave, a threshold is applied to measured intervals to determine whether each interval represents a one or zero. In a preferred embodiment, the threshold interval is transmitted as part of the start sequence with each data transmission set.

Referring to FIG. 2A, the timing diagram illustrates operation of the link 101. Initially the communication link 101 is idle, and the receive logic is in an initial state in 201, ready for a transmission sequence to begin. A transmission sequence begins when the master begins a start sequence indicated by a voltage transition on the communication link 101 from a low to high voltage or from a high to low voltage. The direction of the transition may vary depending upon the state of link during the idle state. The initial transition at 204 is followed by transitions at 206 and 208. The three transitions define a start sequence with two intervals. A start sequence with as few as two transitions (one interval) can be used or a start sequence with more transitions and therefore more intervals can also be used. The width of the intervals defined by the transitions during the start sequence is used to determine a threshold interval width that is used during transmission of the information bits associated with the start sequence to determine whether each information bit of the data is a logical one or a zero.

In an embodiment, the threshold interval is based on the width of the two intervals transferred during the start sequence. The first interval width 205 is the width of the interval between transitions 204 and 206 and the second interval width 207 is between the transitions 206 and 208. The threshold interval may be a multiple of an average of the two intervals 205 and 207, or based on some other aspect or relationship of the two intervals.

In order to determine the value of a transmitted information bit, its interval width is compared to the threshold interval. Thus, the interval between the transition at 208 (the last transition of the start sequence) and the transition at 210, defining the current bit, is measured. If the measured interval is greater than the threshold interval width, the bit is decoded as a one. Note that only one additional transition at 210 is required to define the next information bit.

The slave decodes the next bit transferred as a zero because the bit defined by the transition at 212 has an associated transition interval (between transitions 210 and 212) that is less than the threshold interval width. Note that there is no requirement for accurate timing. All zeros need only be less than the threshold interval width, defined in this particular embodiment as a multiple of the average width of the first two intervals in the start sequence. In other embodiments there may be only one interval in the start sequence and the threshold is defined based on a multiple of the width of the one interval. The multiple may be an integer or a fraction. Alternative embodiments can use more than two intervals in the start sequence, e.g., four transitions or more, and the threshold interval width is determined based on the intervals associated with those transitions. Generally, embodiments can utilize however many intervals are in the start sequence to determine a suitable threshold for zeros and ones.

The next bit defined by the transition at 214 illustrates another advantage of transition interval coding. Assume threshold interval has a value of T and assume the transitions at 210 and 212 define intervals having widths of 1.5 T and T/2, respectively. The interval between 212 and 214 may be much larger, e.g., 10 T or 20 T or greater. That provides flexibility for the transmitting device to respond to more urgent tasks that may be time sensitive and then return to complete the transmission sequence. The only limit on the length of time of transmission of a "1" is the interval width that resets the receive path circuits to their initial state awaiting a transaction. For example, a time limit of 100 T between transitions may be utilized as a reset threshold, at which time the logic in the receive device goes back to an initial state awaiting a start sequence.

As shown in FIG. 2 the transmitter on the communication link can continue transmitting the information bits for the particular transmission sequence and completes the transmission sequence, e.g., at 218. With messages having a fixed or opcode dependent length, the receiver knows when the message is complete and can return to the initial state (or respond to a read command first). The transmission may end with the communication link at a high or low voltage, so the next transition to indicate the start sequence may be a transition in either direction.

However, as a mechanism for addressing a system error, the reset threshold is provided that defines a prolonged period without transitions on the communication link, e.g., 100 T, as discussed above. If the receiver detects a prolonged period on the communication link without transitions since the last transition, e.g., at 220, because of an error in the receiver or transmitter (or otherwise), that exceeds the reset threshold interval, the receive path circuitry resets to the initial state. The reset threshold may also be useful for entering an initial state during system initialization. The reset threshold may be a multiple of other threshold(s) defined in the start sequence or a predetermined quantity.

In an embodiment multiple thresholds allow for m-ary coding instead of being limited to the binary coding just described. For example, two transition interval thresholds may be defined for ternary arithmetic. In such an embodiment, a transferred information symbol having a transition interval width below the first threshold is decoded as a first value, e.g., a one. If the transferred information symbol has an interval width greater than the first threshold and below a second threshold, it is decoded as a second value, e.g., a two. An interval width greater than the second threshold (and less than the reset threshold) is decoded as a third value, e.g., a three. Any interval width greater than the reset threshold resets slave receive circuits to the initial state. Note that the term "bits" as used herein generally refers to exemplary embodiments with binary coding and "information symbol" is intended to more generally refer to m-ary coding.

Figure 2B:
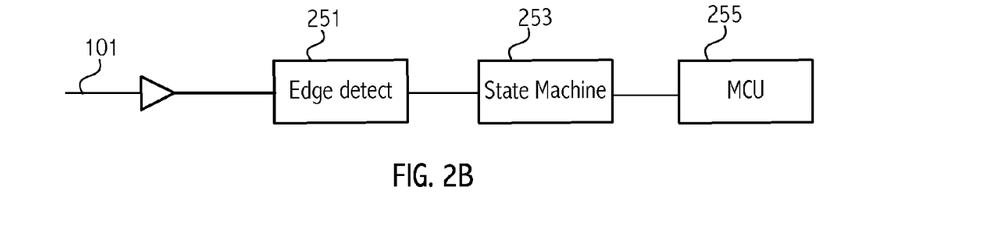
FIG. 2B illustrates a high level block diagram of an exemplary receive path.

FIG. 2B illustrates a high level block diagram of exemplary receive path logic. The receive path circuitry may be implemented, e.g., in combinatorial logic, a state machine, a microcontroller unit (MCU) or any combination to provide the necessary functionality in the receive device. In an embodiment the receive path includes a transition detector 251, state machine 253, and microcontroller (MCU) 255. In an embodiment the transition detector is provided by the MCU periodically sampling the communication link to detect transitions in the voltage level of the link (high or low). The sampling rate will help determine the interval threshold. In other embodiments, dedicated transition detection logic is provided. Such transition detection logic is well known in the art. The state machine may be implemented as part of the MCU or as standalone logic, or as a combination. The counters and compare logic to determine the threshold interval and compare widths of received information bits to the threshold may be implemented by the MCU, in combination with the MCU, or as standalone logic.

Figure 3:
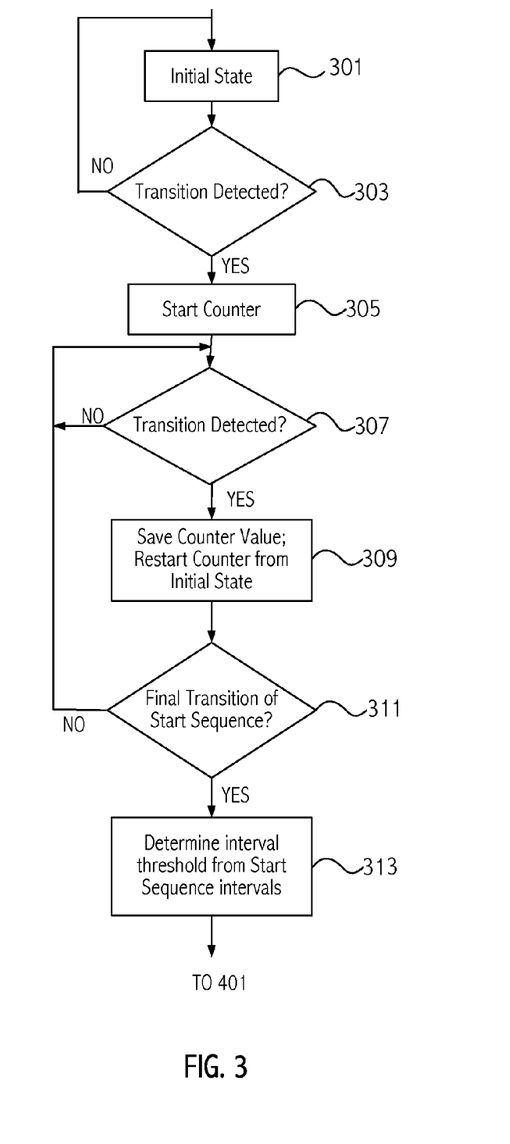
FIG. 3 illustrates a flow diagram of a start sequence.

FIG. 3 illustrates the operation of exemplary receive circuitry in the slave device. In 301, the receive path logic is in the initial state awaiting a start sequence and the communication link is idle (no transitions). At 303, the receiver waits for a transition to occur. As stated above, a transition may be detected using edge detect logic (well known in the art), or the MCU may be used to periodically sample the data line to see if its value has changed. The speed of the communication link may be slower if the microcontroller is sampling the receive data depending on the processing speed of the MCU.

When the transition is detected (a YES at 303), which indicates the beginning of a start sequence, a counter starts counting the interval and the system waits for the next transition in 307. That counter may be part of the MCU or a separate counter. When the transition is detected in 307, the counter value is saved, and the counter is restarted from its initialized state in 309. The logic has to determine if this is the final transition of the start sequence in 311. For example, in the embodiment illustrated in FIG. 2, three transitions define the start sequence. If three transitions have not yet occurred, the flow returns to 307 to await detection of the next transition.

If the detected transition was the third transition, then the threshold interval is determined in 313. In an embodiment the threshold interval is determined as a multiple of the average of the two intervals determined during the start sequence. In other embodiments the counter may start counting at the first transition in the start sequence and stop counting only after the third transition (or however many transitions define the start interval). For example, assume five "intervals" are transferred during the start sequence. The counter starts at the first transition and stops at the last transition. The value of the counter can then be divided and/or multiplied by an appropriate value or values to define the interval threshold that defines the threshold between a zero and one.

Note that an error condition may occur in which a start sequence starts, but never completes. While not shown in FIG. 3, if inactivity occurs on the link for more than the reset threshold period, the receive path logic, including the receive path state machine, resets and returns to the initial state.

Figure 4:
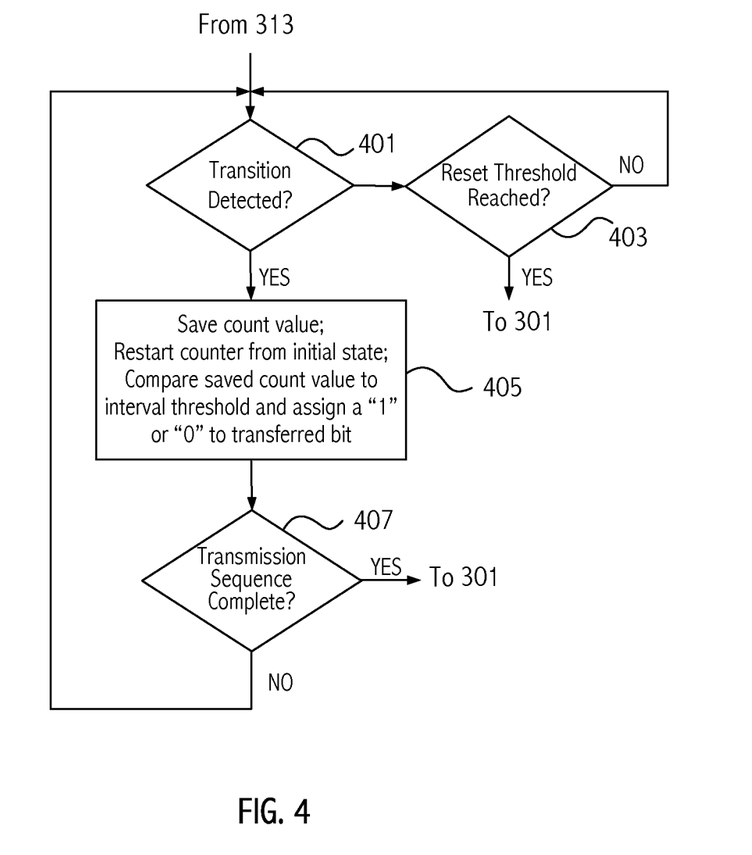
FIG. 4 illustrates a flow diagram of the data transfer portion of a transfer sequence.

Once the start sequence is complete, referring to FIG. 4, the data is transmitted. Remember that the final transition of the start sequence (see 208 in FIG. 2) started a counter in 309. Thus, the first thing to do is to wait for a transition to occur at 401. Note that the reset threshold is checked in 403. In an embodiment the reset threshold is 20 µs, but the reset threshold may of course vary according to the requirements of the particular implementation. If the reset threshold is reached (YES in 403), then the receive logic returns to the initial state 301 to wait for the start sequence. If the reset threshold is not reached, the receive logic just continues to wait for the next edge detection to occur.

If a transition is detected in 401, then in 405 the MCU or other logic saves the count value and restarts the counter to count from its initial state. The saved count value is compared to the threshold interval and the transferred bit receives the appropriate value based on whether it is greater than or less than the threshold interval determined during the start sequence. The receive logic then determines if the transmission sequence is complete in 407 based on a fixed or op-code dependent length and if YES, returns to the initial state 301 to await the next transfer or performs an action consistent with the op-code. If the transmission sequence is not complete, i.e., all information bits not yet received for a particular command, the receive logic returns to 401 to await the next transition or the reset threshold.

Note that in the embodiment described in FIG. 2, an interval length for a received bit below the threshold represents a zero and above the threshold a one. However, that assignment of values is arbitrary, and a "one" could readily be defined as having an interval width below the threshold and a "zero" as having an interval width above the threshold.

While the flow diagrams in FIGS. 3 and 4 are shown in a particular order, the figures are intended to illustrate the operations of a particular embodiment, and not necessarily a required order. Some of the operations may occur in parallel or in a different order. For example, even the start sequence may occur at a location other than the beginning. For example, N information bits may be defined by the first N+1 transitions that begin from the idle state. The sequence defining the threshold width, referred to herein as the start sequence, may occur after transfer of one or more information bits as long as the interval widths associated with the transmitted information bits are saved until the interval threshold width is known. Once the interval threshold becomes known, the transferred information bits may be decoded. Other operations shown in the flow diagrams of FIGS. 3 and 4 may occur in a different order, or simultaneously, according to the particular implementation. Some operations, such as starting the counter on transition detection, are necessarily tied together. Note that, because the voltage level of the bus does not determine a zero or a one, just the transition interval, if an odd number of bits are transmitted on the communication link for a transmission sequence, the bus stops at the same voltage level as it starts.

The use of transition interval coding eliminates the need for accurate timing. All zeros need only be less than the interval threshold. In an embodiment illustrated in FIG. 2, the master makes the width of each output zero the same or less than the average width of the first two intervals of the start sequence, and attempts to make the width of each output one the same or more than three times the average width of the first two intervals of the start sequence. Ones can be arbitrarily long (up to the reset interval threshold), and need not be regular in size. Timing flexibility is provided by way of transition interval coding. Users with poor signal integrity can run slower, while users with good signal integrity can run the communication link more quickly.

While FIGS. 2-4 have assumed a transfer from the master to the slave (downstream direction), transfers typically also occur in the upstream direction. In some embodiments, the transfer upstream may utilize the same line coding previously described for moving data from master to slave (downstream). However, in some systems, keeping the timing of all activities under the control of the master is desirable, which both simplifies the job of the master and makes possible higher data rates (e.g., when the master is MCU firmware and the slave implementation is digital hardware). In such cases, a different protocol for upstream data transfer is needed, which has the needed characteristic that the master controls the timing of all details of the transaction and need not adhere to any fixed schedule or periodicity of data transfer.

Figure 5:
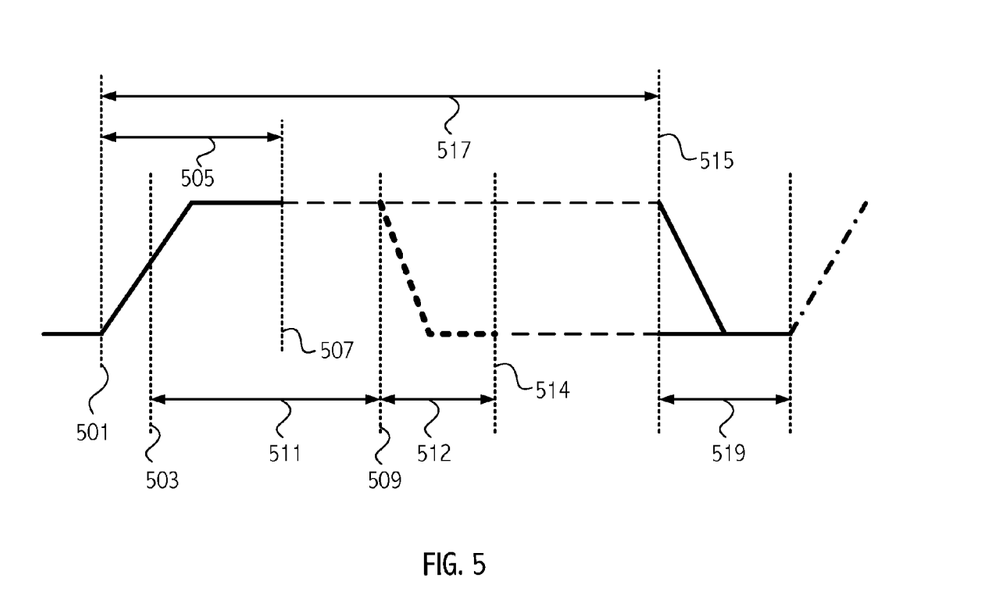
FIG. 5 illustrates a timing diagram illustrating operation of an upstream protocol different from the downstream protocol that may be used on the communication link.

FIG. 5 illustrates an exemplary upstream protocol that differs from the downstream protocol. Note that timing diagram shown in FIG. 5 is simplified in that it ignores the arbitrary polarity of the downstream protocol. While FIG. 5 illustrates a single bit beginning and ending at a logic low level on the bus, it is to be understood that the same protocol can be used (with appropriate reversal of logic levels and transition directions) when the data bits begin and end with a logic high level on the bus.

Referring to FIG. 5 at 501, the master drives a rising edge transition defining the start of an upstream bit transfer. The slave perceives the transition at 503. The master drives the link for a length of time 505, which may be less than a nominal zero for a downstream transfer. The master stops driving at 507. At the end of interval 505, the master is tri-stated; the bus is not driven. Throughout the entire upstream data transfer interval, the slave's weak keeper circuit (107 in FIG. 1) is enabled, ensuring that whenever the bus is not otherwise driven, it remains high or low without drifting into a voltage range which is not clearly logic high or low. If the bit to be transmitted upstream is zero, the slave pulls the link down beginning at 509. The length of time 511 between perceiving the transition at 503 and to starting to pull down the link may be approximately two times the width of a nominal zero. The slave drives the link low and continues to drive it low for a period of time 512 until 514. If the bit to be transferred is a one, then the slave can rely on its weak keeper to keep a one at the communication link at 509 and does not need to drive anything. At a time of its convenience, the master samples the static logic level on the bus, then (at 515) drives the link low for as long as is convenient (interval 519) before the transition that starts the next bit. The master then waits for a period of time until 519 and starts a transition to retrieve the next bit. The particular lengths of time for the various actions by the master and slave in FIG. 5 will vary according to the capabilities and requirements of the particular system.

Note that contention is a significant issue for a single pin serial bidirectional communication link. Any single pin bidirectional protocol needs to ensure that the master and slave do not drive the bus in opposing directions with a high drive strength. Such contention is extremely undesirable and may lead to excessive power consumption and device and system unreliability. In many MCU compatible protocols, contention avoidance is simplified by having no strong pull-up driver on the bus at all. In the protocol described herein, contention is avoided as interval 511 is defined to be longer than interval 505 (slave waits until master's rising edge has been detected plus defined extra time sufficient to ensure master is no longer driving high before driving low). The weak keeper can be easily overcome by either the master or slave without contention, and makes it possible for each of master and slave to drive the bus at times that are very much non-overlapping.

While FIG. 5 illustrates one upstream protocol, other upstream protocols may also be used. In addition, as previously mentioned, the upstream protocol may utilize the transition interval coding of the downstream protocol. In that situation, the slave may respond to a read command by supplying data, after a suitable interval after the read command is complete, having a width that may be defined by the master in the start sequence associated with the read command. In other embodiments, the slave may respond to the read command and define its own interval widths that are used to supply the data in response to the read command.

Figure 6:
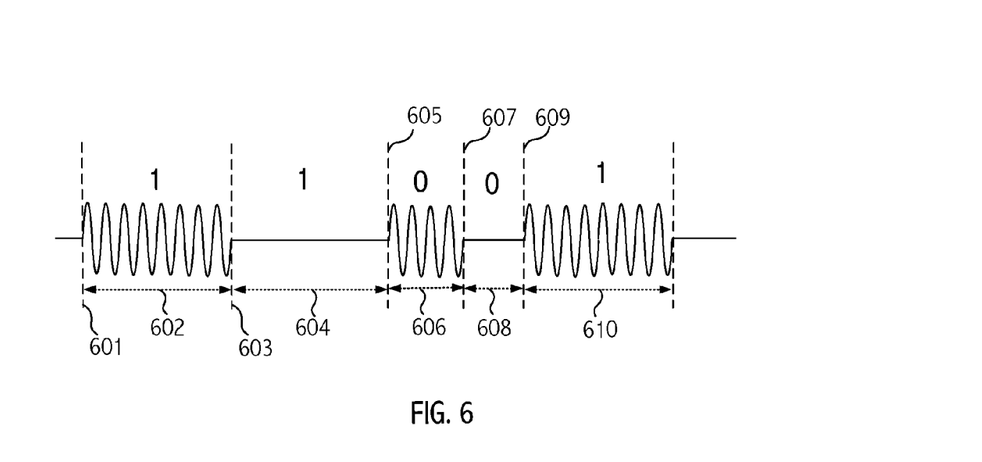
FIG. 6 illustrates an embodiment where RF signaling is used to indicate transitions.

Note that while FIG. 1 and the description above has assumed the communication medium is a single wire coupled to a terminal of an integrated circuit device, the downstream protocol and coding is applicable to other media such as infrared (IR), radio frequency (RF), twisted pair, fiber optics and any serial communication where an interval may be marked by transitions. Thus, 101 in FIG. 1 may represent IR communication, RF communication, twisted pair, fiber optic cable and the communications interface 106 is a communications interface suitable for receiving the signaling received over the particular communication medium. Further, the transitions described above as voltage transitions for particular embodiments may be other transitions, e.g., a transition between frequencies being transmitted. For example, transition interval coding may be used in on-off keying (OOK) as shown in FIG. 6. The transitions at 601 between no carrier and carrier and at 603 between carrier and no carrier define an interval 602. That transition interval 602 is determined to be a "1" based on the interval width. Similarly, the interval 604 between transitions 603 and 605 is determined to be a "1" based on the length of its interval. The presence or absence or carrier waves does not determine the value transmitted, only the length of the interval. Intervals 606 and 608 defined by transitions 605, 607, and 609 are determined to both be "0" and interval 610 is again a "1". While FIG. 6 shows transitions between carrier and no carrier, the transitions could be between different frequencies. Further, while single-wire communication was described in association with single wire 101, the serial communications may use differential transmission and thus, two wires may be used to serially transfer an information symbol.

In addition, while defining the interval threshold in the start sequence is described in the embodiment illustrated in FIGS. 2-4, other embodiments may have predetermined interval threshold(s). In such circumstances, a single transition may be the start sequence, and information symbols may be transmitted using subsequent transitions in accordance with the predetermined interval thresholds.

The description of the invention set forth herein is illustrative, and is not intended to limit the scope of the invention as set forth in the following claims. It should be understood that the drawings and detailed description herein are to be regarded in an illustrative rather than a restrictive manner, and are not intended to be limiting to the particular forms and examples disclosed. Further modifications, changes, rearrangements, substitutions, alternatives, design choices, may be made without departing from the scope of the invention as set forth in the following claims.

What is claimed is:

1. A method comprising:
   determining in a receiving device a width of one or more first intervals defined by a first number of transitions on a communication link, a first interval of the first intervals being defined by first and second transitions on the communication link, the first transition from a first to a second voltage, and the second transition from the second to the first voltage and wherein the communication link remains at the second voltage between the first and second transitions;
   defining one or more threshold intervals based on the one or more first intervals;
   receiving additional transitions on the communication link;
   determining a value of each data symbol associated with each of the additional transitions based on whether a width of each interval defined by each of the additional transitions is larger or smaller than at least one of the one or more threshold intervals;
   transmitting data from the receiving device to a first device over the communication link using a protocol that differs from transfers from the first device to the receiving device;
   as part transmitting the data from the receiving device to the first device, the first device causing a transition on the communication link from the first voltage to the second voltage and continuing to drive the communication link at the second voltage after the transition and then stopping driving the communication link prior to data transfer from the receiving device to the first device;
   the receiving device driving the communication link to the first voltage and then stopping driving the communication link prior to sampling of the data by the first device;
   after the receiving device stops driving the communication link, maintaining the communication link at the first voltage using a keeper circuit in the receiving device; and
   the first device sampling the data after the receiving device stops driving the communication link and then the first device driving the communication device at the first voltage level.

2. The method as recited in claim 1 wherein two data symbols having a same value are received with different interval widths.

3. The method as recited in claim 1 wherein the first transitions define a start sequence of a transmission sequence that includes the additional transitions.

4. The method as recited in claim 3 wherein the start sequence is from an idle condition on the communication link.

5. The method as recited in claim 1 wherein the first number of transitions is three including the first and second transitions, the three transitions defining a start sequence of two first intervals.

6. The method as recited in claim 5 wherein the one threshold interval is defined as a multiple of a sum of the two first intervals.

7. The method as recited in claim 1 further comprising:
causing receive circuits in the receiving device to be reset to an initial state when a transition fails to occur before a reset threshold, the reset threshold being longer than the one or more threshold intervals.

8. The method as recited in 1 further comprising receiving a transmission sequence including the transitions on the communication link on a single pin on the receiving device.

9. The method as recited in claim 1 further comprising resetting receive path circuits in the receiving device if a transition does not occur for a predetermined amount of time, longer than the one or more threshold intervals.

10. A method of serially transmitting information on a communication link comprising:
transmitting a start sequence over the communication link from a first device to a second device, the start sequence including at least two transitions that define a threshold interval, the start sequence being part of a transmission sequence that includes transmission of a data symbol;
transmitting the data symbol from the first device to the second device over the communication link by causing a transition on the communication link, the data symbol having an interval length defined between the transition and a previous transition on the communication link, the interval length being below a threshold interval if the data symbol is a first value and the interval length being above the threshold interval if the data symbol is a second value; and
transmitting data from the second device to the first device using a protocol that differs from transfers from the first device to the second device;
as part transmitting the data from the second device to the first device, the first device causing another transition on the communication link from a first voltage to a second voltage and continuing to drive the communication link at the second voltage after the other transition and then stopping driving the communication link prior to data transfer from the second device to the first device;
the second device driving the communication link to the first voltage and then stopping driving the communication link prior to sampling of the data by the first device;
after the second device stops driving the communication link, maintaining the communication link at the first voltage using a keeper circuit in the second device; and
the first device sampling the data after the second device stops driving the communication link and then the first device driving the communication device at the first voltage.

11. The method as recited in claim 10 further comprising transmitting during the transmission sequence two data symbols having the second value with different interval widths.

12. An apparatus comprising:
a communication link interface coupled to a communication link;
a transition detector coupled to the communication link interface to detect transitions on the communication link between a first voltage and a second voltage with the communication link remaining at one of the first and second voltages between the first and second transitions;
an interval measurement circuit coupled to the transition detector and configured to determine an interval defined by a transition on the communication link and a previous transition on the communication link and supply a measured transition interval; and
compare logic to compare the measured transition interval associated with an information symbol to a threshold interval, and determine the information symbol to be a first value if the measured transition interval is less than the threshold interval and determine the information symbol to be a second value if the measured transition interval is greater than the threshold interval;
wherein for adjacent first and second information symbols transmitted on the communication link, the communication link remains at a first steady state voltage between transitions defining a first interval associated with the first information symbol and the communication link remains at a second steady state voltage between transitions defining a second interval associated with the second information symbol;
wherein the interface is on a first device and the first device is configured to transmit data from the first device to a second device over the communication link according to a protocol that differs from transfers from the second device to the first device;
and wherein the protocol includes the communication link being driven by the second device from the first voltage to the second voltage and then driven by the second device at the second voltage and then after the communication link is no longer being driven, the first device is configured to drive the communication link to the first voltage to transmit a bit with a first value and then stop driving the communication link prior to sampling of the data by the second device; and
a keeper circuit on the first device to maintain the communication link at the first voltage after the first device stops driving the communication link and wherein the first device is configured to allow the communication link to be kept at the second value by the keeper circuit to transmit a bit with the second value without driving the communication link.

13. The apparatus as recited in claim 12 further comprising:
threshold interval determination logic to determine the threshold interval from one or more transition intervals associated with two or more transitions during a start sequence of a transmission sequence.

14. The apparatus as recited in claim 12 wherein the threshold interval is predetermined.

15. The apparatus as recited in claim 12 wherein the first device further comprises a microcontroller implementing at least one of the transition detector and the compare logic.

16. The apparatus as recited in claim 12 further comprising:
the second device, the second device including a transmitter coupled to the communication link to supply the transition on the communication link and the previous transition and thereby encode the information symbol that was transmitted.

\* \* \* \* \*